US007123770B2

(12) United States Patent
Raghupathy et al.

(10) Patent No.: US 7,123,770 B2
(45) Date of Patent: Oct. 17, 2006

(54) INCREMENTAL SYSTEM FOR REAL TIME DIGITAL INK ANALYSIS

(75) Inventors: Sashi Raghupathy, Redmond, WA (US); Michael M Shilman, Seattle, WA (US); Zile Wei, Beijing (CN); F. David Jones, Redmond, WA (US); Charlton E Lui, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 786 days.

(21) Appl. No.: 10/143,804

(22) Filed: May 14, 2002

(65) Prior Publication Data

US 2003/0215138 A1    Nov. 20, 2003

(51) Int. Cl.
 *G06K 9/46* (2006.01)
(52) U.S. Cl. .................................................. 382/202
(58) Field of Classification Search .............. 382/202
 See application file for complete search history.

(56) References Cited

U.S. PATENT DOCUMENTS 6,028,959 A    2/2000   Wang et al.

OTHER PUBLICATIONS

Rui Zhao, "Incremental Recognition in Gesture-Based and Syntax-Directed Diagram Editors", pp. 95-100, 1993 ACM.
Thomas Fontaine et al., "A Hybrid System for Handprinted Word Recognition", pp. 227-234, 1993 IEEE.
Peter Tandler et al., "Using Incremental Gesture Recognition to Provide Immediate Feedback while Drawing Pen Gestures", 2001.
Michael Shilman et al., "Statistical Visual Language Models for Ink Parsing", pp. 126-132, 2002.
Steve Smithies et al., "A Handwriting-Based Equation Editor", pp. 84-91, 1999.
European Search Report dated Nov. 18, 2004.

*Primary Examiner*—Joseph Mancuso
*Assistant Examiner*—Robert Tarcu
(74) *Attorney, Agent, or Firm*—Banner & Witcoff, Ltd.

(57) ABSTRACT

Flexible and efficient systems and methods for organizing, analyzing, and processing digital ink incrementally analyze input data (e.g., representing ink strokes) as the user continues to add to, edit, or modify the data. In this manner, processing is performed promptly as the ink is entered, and the processing system and method can effectively keep up with the user. This prevents long processing delays, because the systems and methods need not first process a large volume of ink data present after the user has entered has completely filled a page with ink.

33 Claims, 12 Drawing Sheets

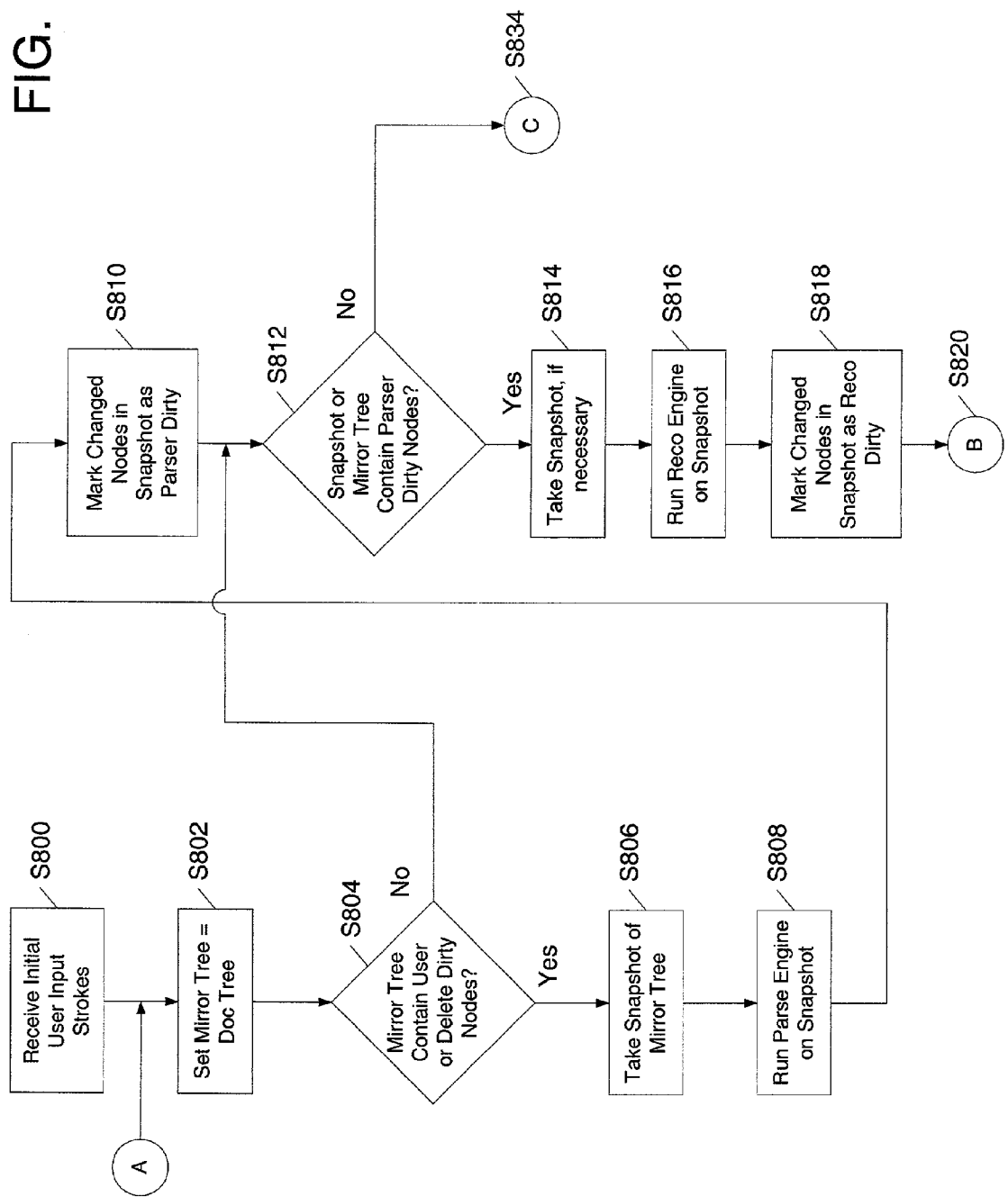

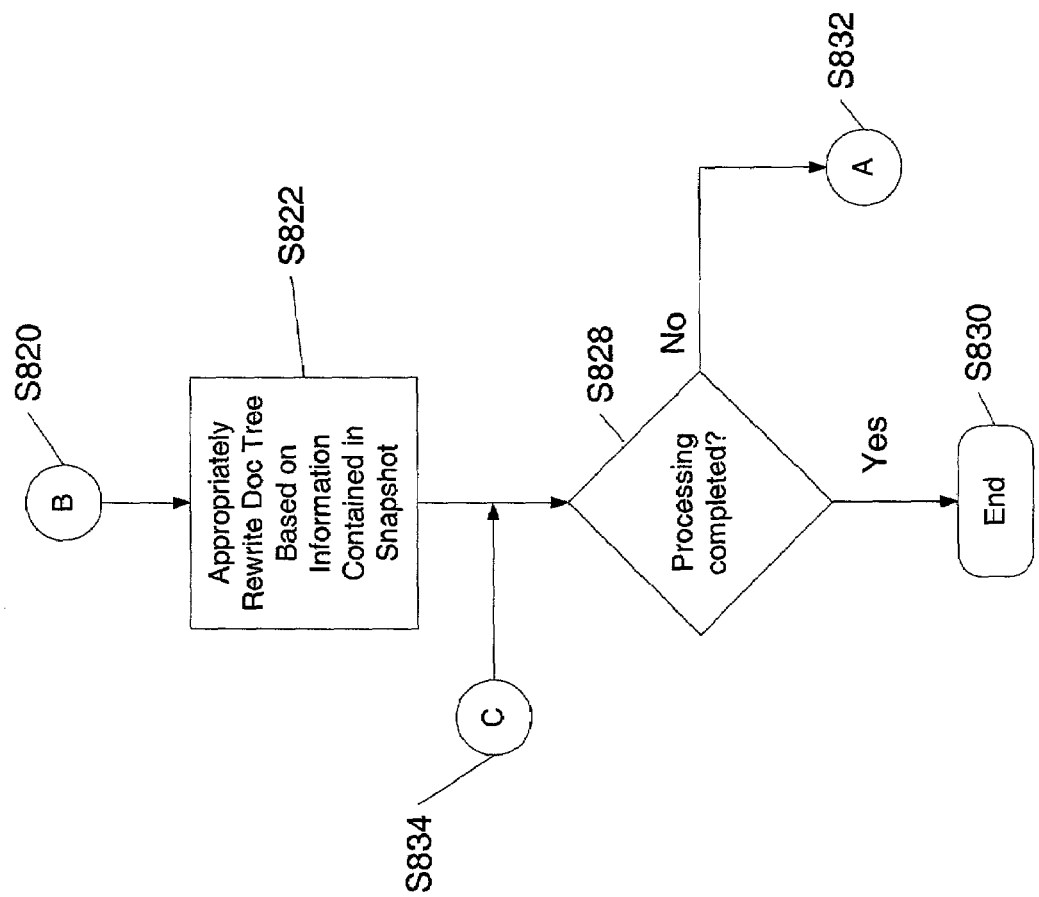

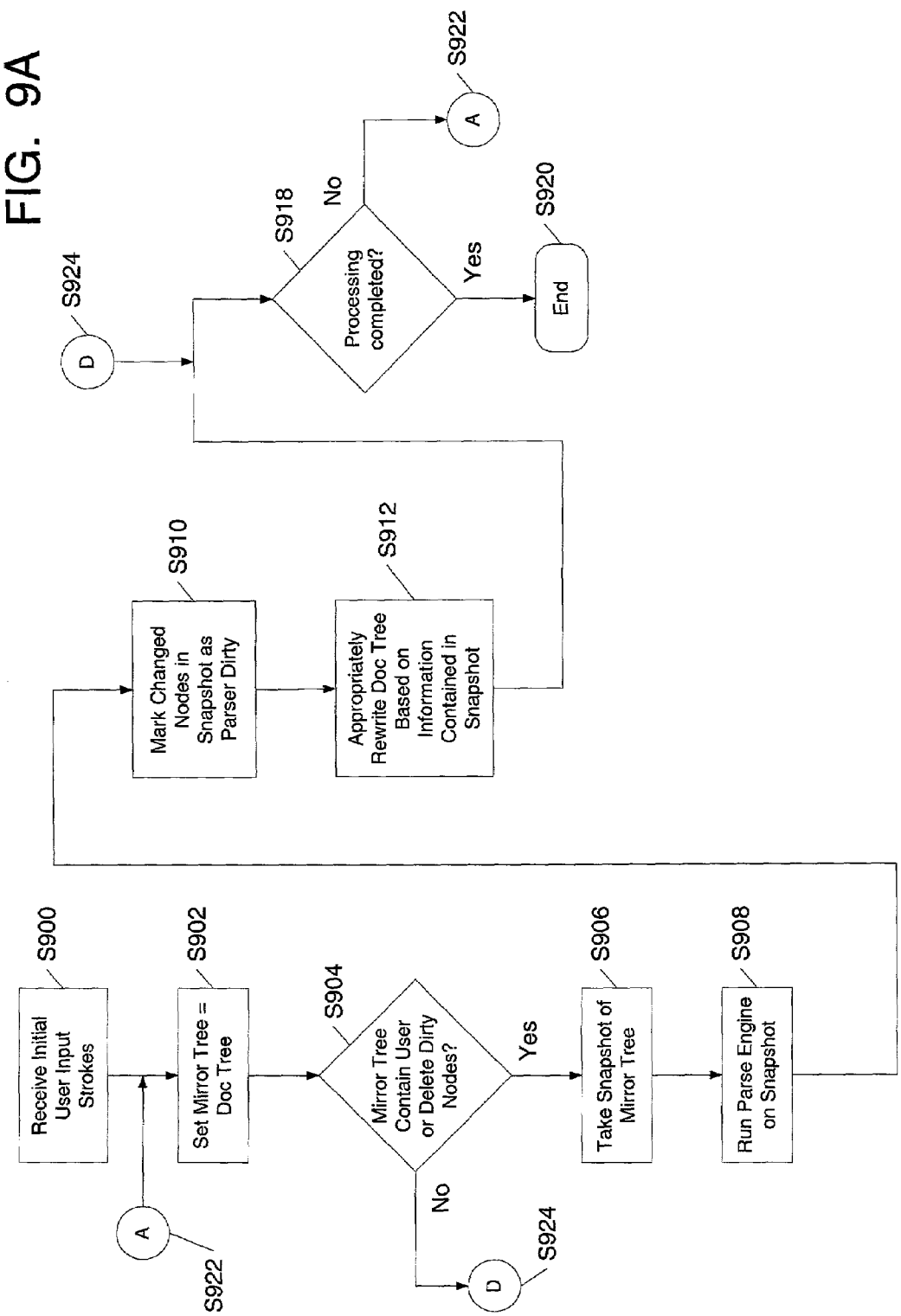

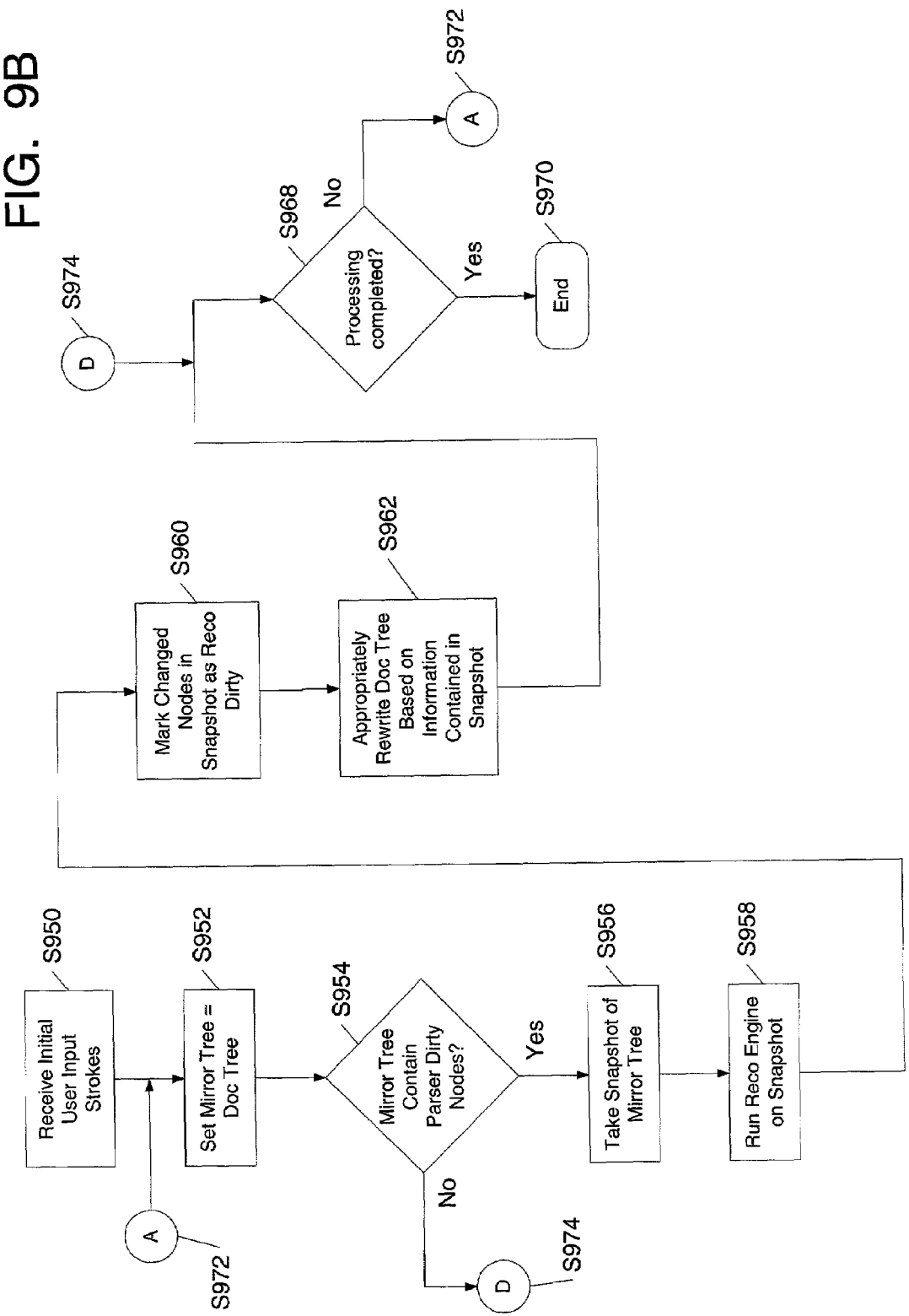

INCREMENTAL SYSTEM FOR REAL TIME DIGITAL INK ANALYSIS

TECHNICAL FIELD

Aspects of the present invention are directed generally to systems and methods for processing handwritten digital ink.

BACKGROUND

Typical computer systems, especially computer systems using graphical user interfaces ("GUIs"), such as Microsoft WINDOWS®, are optimized for accepting user input from one or more discrete input devices. Typical input devices include a keyboard for entering text and a pointing device, such as a mouse with one or more buttons, for operating the user interface. The ubiquitous keyboard and mouse interface provides for fast creation and modification of documents, spreadsheets, database fields, drawings, photos, and the like. However, a significant gap exists between the flexibility provided by the keyboard and mouse interface compared with non-computer (i.e., standard) pen and paper. With the standard pen and paper, a user may edit a document, write in non-horizontal directions, write notes in a margin, draw pictures and other shapes, link separate sets of notes by connecting lines or arrows, and the like. In some instances, a user may prefer to use a pen to mark-up a document rather than review the document on-screen because of the ability to freely make notes outside of the confines and restrictions of the keyboard and mouse interface.

Some computer systems, however, permit a user to write on a screen (e.g., using a "stylus" or "pen" for writing notes on an electronic input screen). For example, the Microsoft READER application permits one to add digital ink (also referred to herein as "electronic ink" or "ink") to a document. The system stores the ink and provides it to a user when requested. Other applications (for example, drawing applications as known in the art associated with the Palm 3.x and 4.x and PocketPC operating systems) permit the capture and storage of drawings. These drawings may include other properties associated with the ink strokes used to make up the drawings. For instance, line width and color may be stored with the ink. One goal of these systems is to replicate the look and feel of physical ink being applied to a piece of paper.

One activity normally reserved for physical ink and paper is note taking. Personal notes are unique as each user. Some users take notes using complete sentences, while others jot down thoughts or concepts and then link the concepts using arrows and the like. The latter type of notes tends to be written at different locations on a page and/or at different angles on the page. Additionally, some users revisit notes later and add further thoughts, clarify, and/or edit previously recorded notes. The value present in handwritten notes may rest not only in the actual text of the information recorded, but also in the layout of the notes and the juxtaposition of some notes with respect to others. Further value may be added in the speed at which users take notes.

The transition from an ink pen and physical paper note taking arrangement to a computer-based note taking arrangement may prove difficult. While computer-based note taking systems can provide advantages including handwriting recognition functionality, searchability, and written text reformatting, users may quickly become disoriented or frustrated when the computer-based system does not function as expected.

As an example, a number of systems for electronically capturing, rearranging, and displaying handwriting as digital ink are known (for example, the InkWriter® system from Aha! Software, now owned by Microsoft Corporation of Redmond, Wash.). These systems capture ink strokes and group the strokes into characters and words. Writing in multiple regions on a page, as many users do, can quickly result in confusion, for example, if information intended to be maintained as separate notes is combined by the system into a single, incoherent note. Also, in some existing systems, drag selection (akin to holding down a mouse button and dragging to select text in a text editor) may select large areas of blank space (i.e., white space) on the page. When this selected text is cut and pasted (using standard computer-based text editing concepts) or otherwise utilized, the large volume of selected blank space may produce an unintended and surprising result. This result is counterintuitive to the average computer user because conventional text editing systems work differently.

Additionally, some known systems that capture ink strokes require relatively structured ink input in order to function in an acceptable manner. For example, users of such systems typically are admonished to "write neatly" or "write between the lines" in a horizontal orientation or write in a specified ink input area. Failure to follow these instructions may cause recognition errors or other errors when the electronic ink is presented to an associated handwriting recognition system, thereby limiting the usefulness of the system for electronic note taking. Also, some users quickly become frustrated with these errors and limitations of the system and/or become frustrated when forced to constrain and adapt their handwriting to better "work around" the limitations of the system.

Data processing in pen-based computing systems also can be a source of frustration for users. Processing handwritten digital ink can be time consuming, particularly when a document contains a large volume of ink data for processing. Excessive delays and "down time" to allow for data processing may dissuade some users from switching to pen-based computing systems.

These shortcomings of existing electronic note taking systems effectively create barriers to adoption of pen-based computing systems.

SUMMARY

The present invention provides flexible and efficient systems and methods for organizing, analyzing, and processing digital ink. The systems and methods according to this invention incrementally analyze the input data (e.g., representing ink strokes) as the user continues to add to, edit, or modify the data. In this manner, processing is performed promptly as the user enters the ink, and the processing system can effectively keep up with the user and adapt to changes made as the user revises an existing electronic ink document. In some examples of the invention, a plurality of ink analysis engines run asynchronously in the background, as a user optionally continues adding more ink to the document or modifying existing ink in the document. Systems and methods according to examples of the invention prevent long processing delays, because these systems and methods need not first process large volumes of ink data present after the user has completely filled a page with ink.

These and other features and aspects of the invention will be apparent upon consideration of the following detailed description.

BRIEF DESCRIPTION OF THE DRAWINGS

The foregoing Summary, as well as the following Detailed Description, may be better understood when read in conjunction with the accompanying drawings, which are included by way of example, and not by way of limitation with regard to the claimed invention.

FIGS. 8A and 8B illustrate flow charts describing operation of systems and methods according to another example of the present invention.

FIGS. 9A and 9B illustrate flow charts describing operation of systems and methods according to another example of the present invention.

DETAILED DESCRIPTION

As described above, examples of the present invention relate to flexible and efficient systems and methods for organizing, analyzing, and processing digital ink, e.g., in a pen-based computing system. The invention also relates to computer-readable media that contain computer-implementable instructions for operating systems and/or performing methods according to the invention. The following describes various examples of the invention in more detail.

Figure 3:
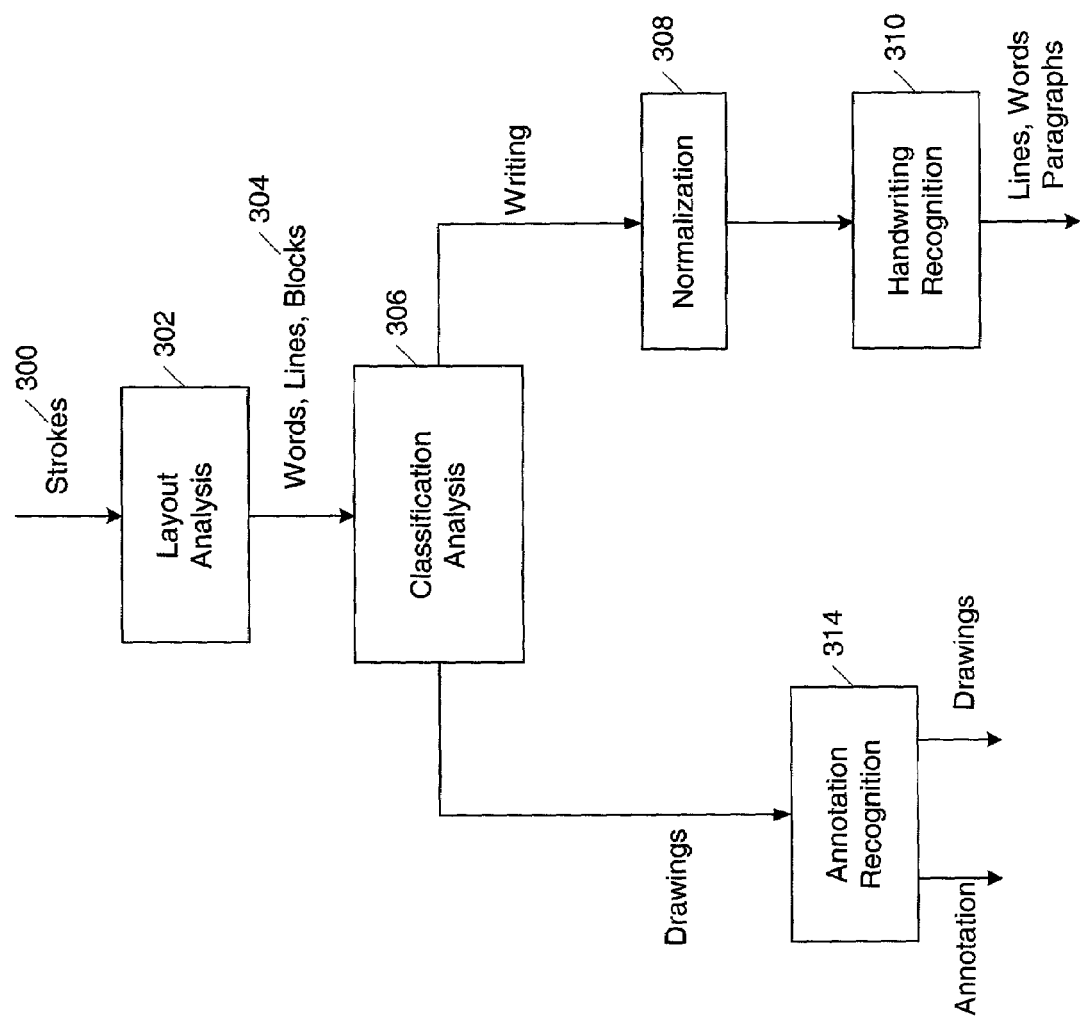
FIG. 3 illustrates an example of an overall digital ink processing system that may be used in practicing this invention.
Figure 4:
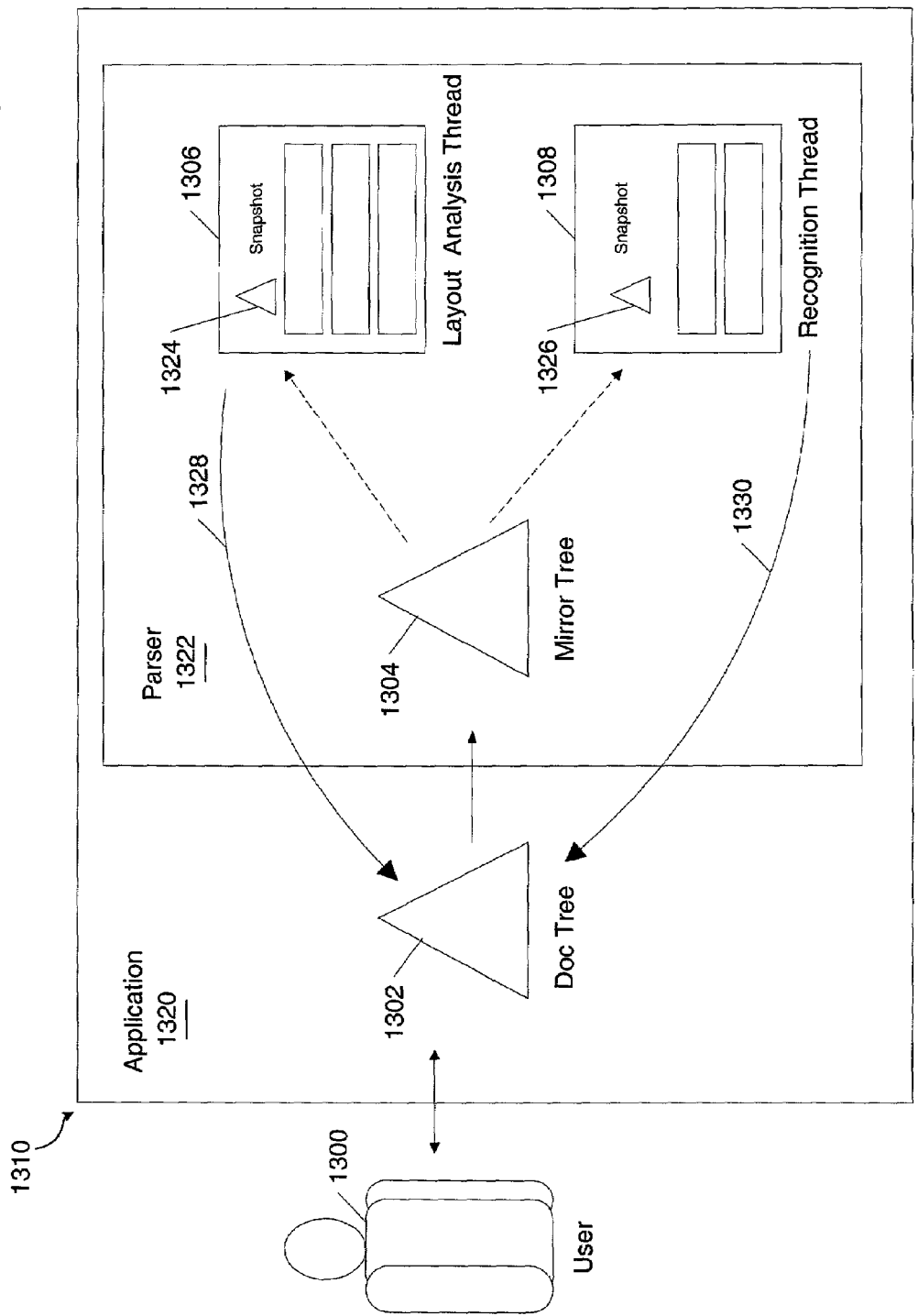
FIG. 4 illustrates a schematic diagram of an example of a system according to the present invention.
Figure 5:
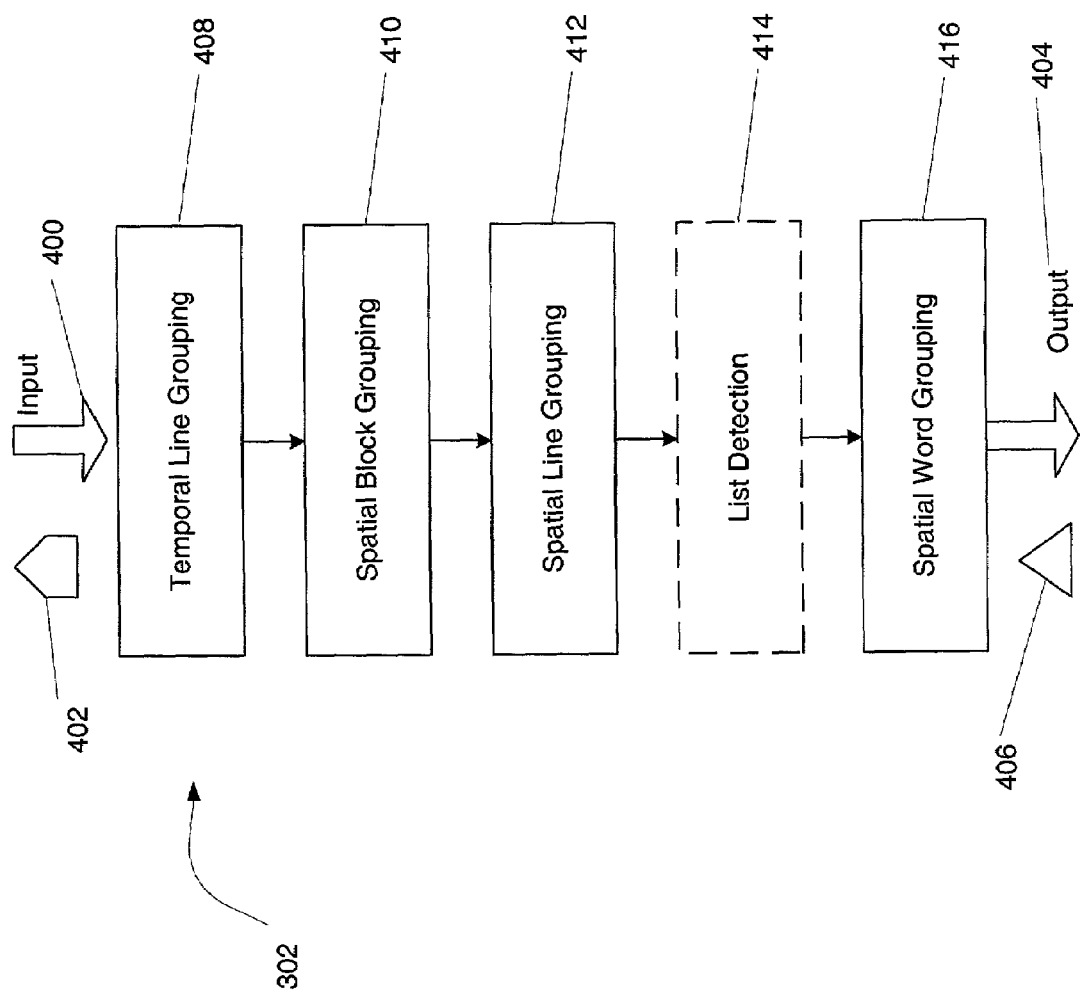
FIG. 5 illustrates a general example of various procedures or parse engines that may be used in a layout analysis used in some examples of the systems and methods according to the invention.

This specification describes figures that schematically illustrate various methods and systems useful in practicing examples of the invention (e.g., FIGS. 3, 4, and 5). These schematic illustrations are intended to generally illustrate both systems and methods useful in accordance with the invention. Therefore, in some instances, depending on the context of the sentence, a specific element from these figures (such as layout analysis element 302, temporal line grouping element 408, and the like) may be referred to as a system (e.g., a temporal line grouping system 408), while in other instances that same element and reference number may be used in reference to a method, a procedure, a step, a parse engine, and/or the like. All of these variations (e.g., systems, methods, steps, procedures, parse engines, and the like) are intended to be included within the scope of these figures.

The following description is divided into sub-sections to assist the reader. The sub-sections include: Terms, General-Purpose Computer, Description of Examples of Systems and Methods According to the Invention, and Conclusion.

I. Terms

The following terms are used in this specification:

Ink (also called "digital ink" or "electronic ink")—A sequence or set of handwritten strokes. A sequence of strokes may include strokes in an ordered form. The sequence may be ordered in any suitable manner, such as by the time the stroke was captured and/or by where the stroke appears on a page. Other orders are possible.

Point—Information defining a location in space. For example, a point may be defined relative to a capturing space (for example, points on a digitizer) and/or a display space (the points or pixels of a display device). Points may be represented using a variety of known techniques including two dimensional Cartesian coordinates (X, Y), polar coordinates (r, $\Theta$), three dimensional coordinates ((X, Y, Z), (r, $\Theta$, $\rho$), (X, Y, t (where t is time)), (r, $\Theta$, t)), four dimensional coordinates ((X, Y, Z, t) and (r, $\Theta$, $\rho$, t)), and other techniques as known in the art.

Stroke—A sequence or set of captured points. A stroke may be determined in a number of ways, for example, using time (e.g., a stroke is all points encountered by the stylus during a predetermined time interval), using a predetermined number of points (e.g., a stroke is all points 1 through X where X is predefined), or using stylus contact with the digitizer surface (e.g., a stroke is all points encountered by the stylus between a pen-down event and a pen-up event). When rendered, the sequence of points may be connected with lines. Alternatively, a stroke may be represented as a point and a vector in the direction of the next point. Further, a stroke may be referred to as a simple list (or array or table) of points. In short, a stroke is intended to encompass any representation of points or segments relating to ink, irrespective of the underlying representation of points and/or what connects the points.

Render—The process of determining how graphics (and/or ink) are to be displayed, whether on a screen or printed.

Figure 6B:
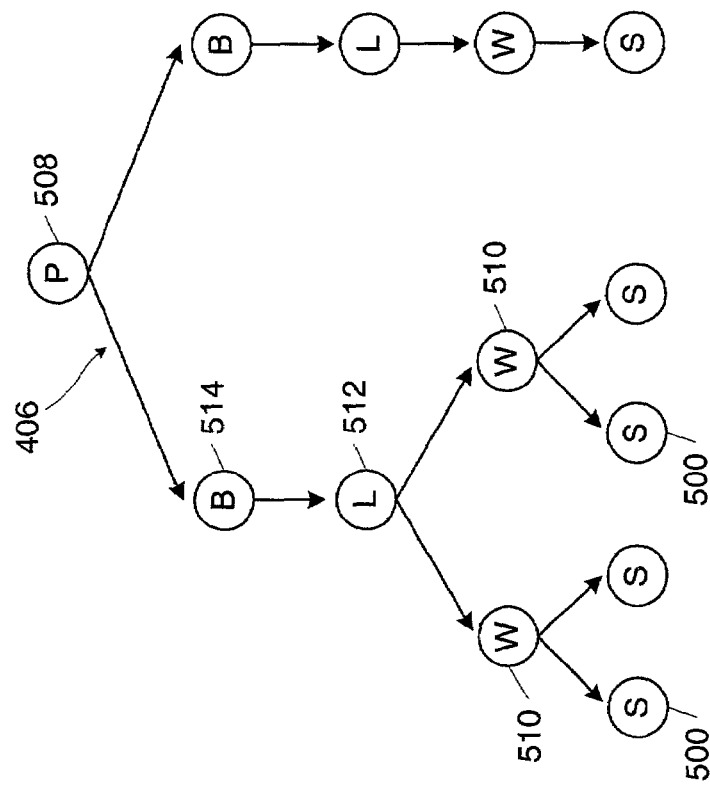
FIGS. 6A and 6B illustrate examples of parse trees describing input data structures used in some examples of systems and methods according to the invention.
Figure 6A:
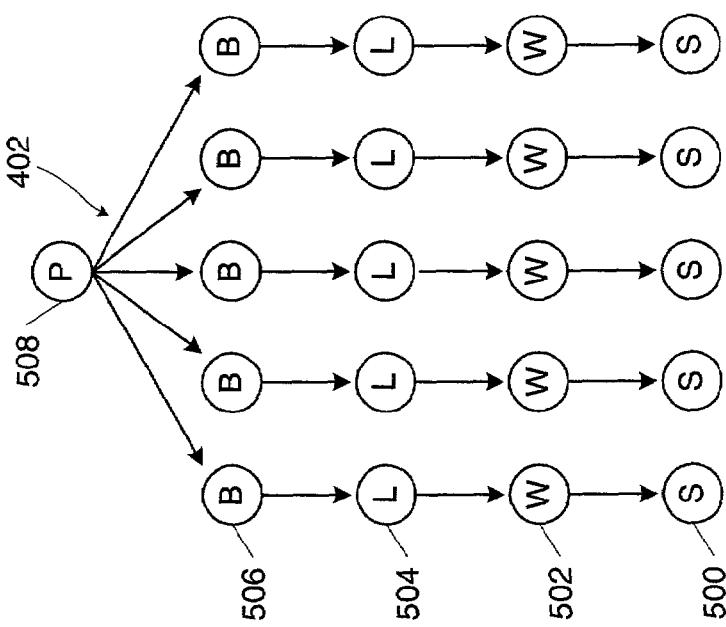

Parse Tree—A data structure representing the structure of a document. FIGS. 6A and 6B illustrate examples of parse trees, both before and after a layout analysis procedure, wherein a given page of a document is parsed into blocks, lines, words, and individual strokes.

Parse engine—A single processing step or procedure in an ink analysis engine. A typical ink analysis engine contains several parse engines, each focusing on a particular task. One example of an ink analysis engine is the layout analysis engine described herein, which includes individual parse engines for temporal line grouping, spatial block grouping, spatial line grouping, list detection, and spatial word grouping. A parse engine takes a parse tree data structure as input and modifies it (if appropriate) to produce a parse tree with a different data structure, which in turn may be passed along as input to the next parse engine.

II. General-Purpose Computer

Figure 1:
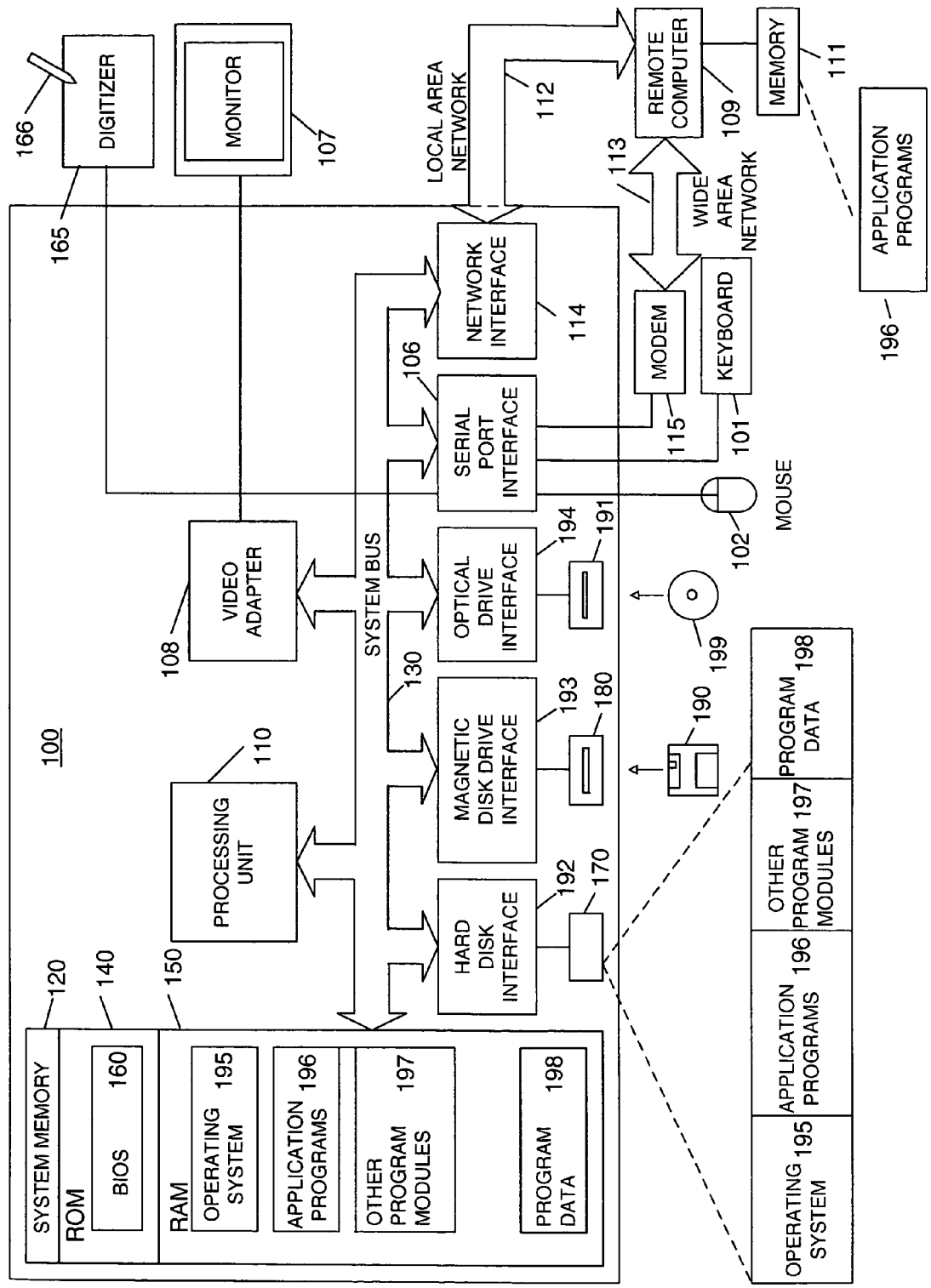
FIG. 1 illustrates a schematic diagram of an exemplary general-purpose digital computing environment that may be used to implement various aspects of the present invention.

FIG. 1 illustrates a schematic diagram of an exemplary conventional general-purpose digital computing environment that may be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 199, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules, and other data for the personal computer 100. It will be appreciated by those skilled in the art that other types of computer readable media that may store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules may be stored on the hard disk drive 170, magnetic disk 190, optical disk 199, ROM 140, or RAM 150, including an operating system 195, one or more application programs 196, other program modules 197, and program data 198. A user may enter commands and information into the computer 100 through input devices, such as a keyboard 101 and a pointing device 102. Other input devices (not shown) may include a microphone, joystick, game pad, satellite dish, scanner, or the like. These and other input devices often are connected to the processing unit 110 through a serial port interface 106 that is coupled to the system bus 130, but may be connected by other interfaces, such as a parallel port, game port, or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor 107, personal computers typically include other peripheral output devices (not shown), such as speakers and printers. As one example, a pen digitizer 165 and accompanying pen or user input device 166 are provided in order to digitally capture freehand input. The pen digitizer 165 may be coupled to the processing unit 110 via the serial port interface 106 and the system bus 130, as shown in FIG. 1, or through any other suitable connection. Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107.

The computer 100 may operate in a networked environment using logical connections to one or more remote computers, such as a remote computer 109. The remote computer 109 may be a server, a router, a network PC, a peer device, or other common network node, and typically includes many or all of the elements described above relative to the computer 100, although only a memory storage device 111 with related applications programs 196 have been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet.

When used in a LAN networking environment, the computer 100 is connected to the local network 112 through a network interface or adapter 114. When used in a WAN networking environment, the personal computer 100 typically includes a modem 115 or other means for establishing a communications link over the wide area network 113, e.g., to the Internet. The modem 115, which may be internal or external, is connected to the system bus 130 via the serial port interface 106. In a networked environment, program modules depicted relative to the personal computer 100, or portions thereof, may be stored in a remote memory storage device.

It will be appreciated that the network connections shown are exemplary and other techniques for establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Figure 2:
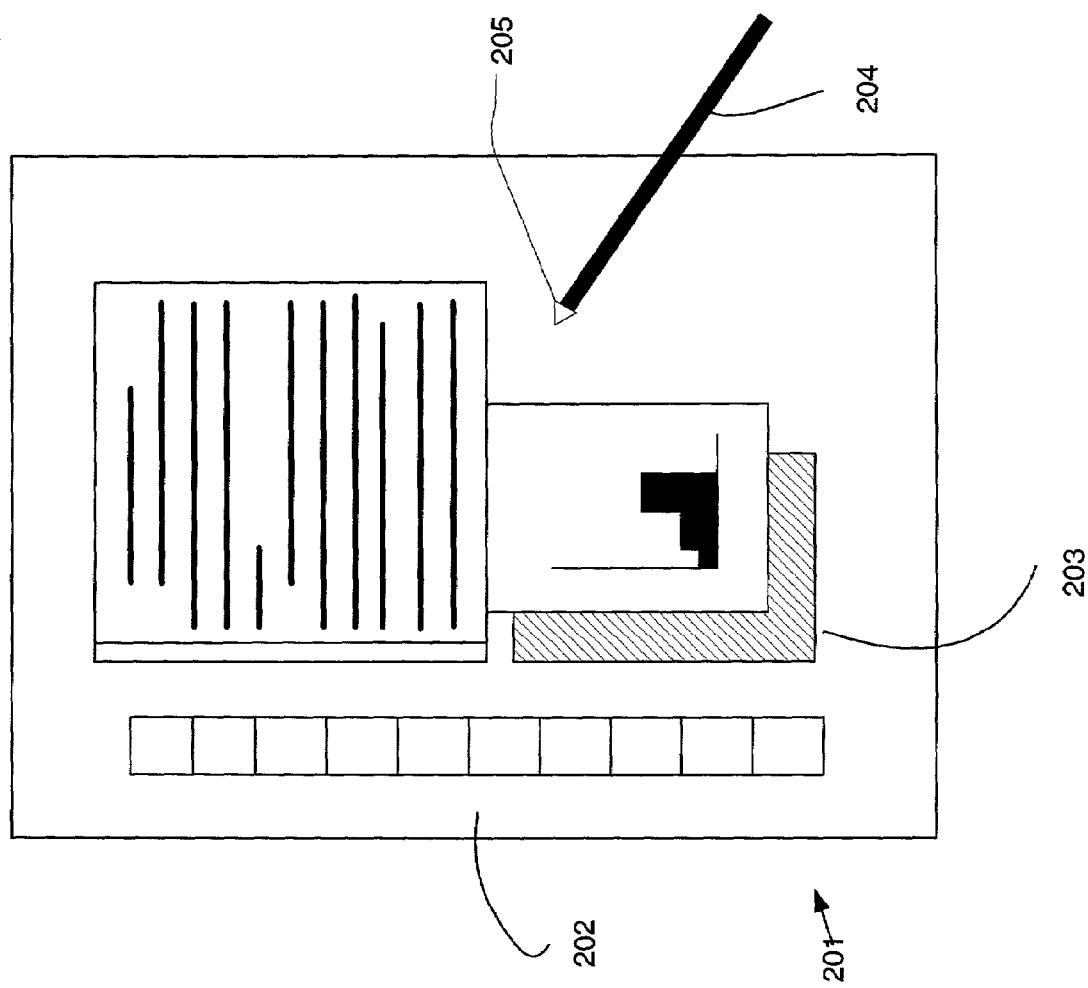
FIG. 2 illustrates an exemplary pen-based computing system that may be used in accordance with various aspects of the present invention.

FIG. 2 illustrates an exemplary pen-based computing system 201 that may be used in accordance with various aspects of the present invention. Any or all of the features, subsystems, and functions in the system of FIG. 1 may be included in the computer of FIG. 2. Pen-based computing system 201 includes a large display surface 202, e.g., a digitizing flat panel display, such as a liquid crystal display (LCD) screen, on which a plurality of windows 203 is displayed. Using stylus 204, a user may select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Pen-based computing system 201 interprets gestures made using stylus 204 in order to manipulate data, enter text, create drawings, and/or execute conventional computer application tasks, such as spreadsheets, word processing programs, and the like.

The stylus 204 may be equipped with one or more buttons or other features to augment its selection capabilities. In one example, the stylus 204 may be implemented as a "pencil" or "pen," in which one end constitutes a writing element and the other end constitutes an "eraser" end, and which, when moved across the display, indicates portions of the display to be erased. Other types of input devices, such as a mouse, trackball, or the like also may be used. Additionally, a user's own finger may be the stylus 204 and used for selecting or indicating portions of the displayed image on a touch-sensitive or proximity-sensitive display. Consequently, the term "user input device," as used herein, is intended to have a broad definition and encompasses many variations on well-known input devices, such as the stylus 204. Region 205 shows a feedback region or contact region permitting the user to determine where the stylus 204 contacted the display surface 202.

Systems and methods according to the invention may relate to an overall electronic ink processing system or method. Various examples of the invention are described in more detail below.

III. Description of Examples of Systems and Methods According to the Invention

A. General System

FIG. 3 is a flow diagram that illustrates an example of an overall system and method in which the incremental ink analysis systems and methods according to some examples of this invention may be used. In the example of FIG. 3, incoming or input strokes 300 first are subjected to a layout analysis procedure 302, which combines and parses the individual input strokes 300 into associated stroke sets, such as words, lines, blocks, and/or other groupings 304. In general, the layout analysis method or engine 302 ascertains certain information relating to the layout of ink strokes 300 on a page.

After layout analysis 302, the data may be introduced into a variety of additional ink analysis engines. In the system illustrated in FIG. 3, the data is next introduced to a classification analysis system or engine 306. The classification analysis system or engine 306 determines the type(s) of strokes included in the specific input data (e.g., whether individual strokes or stroke sets represent flow diagrams, freeform drawings, text, music, mathematics, charts, graphs, etc.). In other examples of the invention, a user may "inform" the system as to the type of input strokes, e.g., by selecting a "drawing mode," a "text mode," or the like.

Further processing of the input ink may depend on the stroke type recognized by the classification analysis system or engine 306 (or otherwise determined). For example, for strokes or stroke sets that are classified as textual writing, the classified stroke sets may be sent to a handwriting recognition system 310 or another appropriate processing system. If necessary or desired, prior to introduction into the handwriting recognition system 310 or other processing system, the input ink data may be "normalized" using a normalization algorithm or system 308, to place the input ink data in an optimum orientation for analysis by the handwriting recognition system 310 or other processing system (e.g., to rotate the text to a horizontal base line, if necessary). Conventional normalization systems or methods 308 and/or handwriting recognition systems or methods 310 may be used without departing from the invention. The data output from the handwriting recognition system or method 310 may constitute or link to machine-generated text (e.g., lines, words, paragraphs, etc.) usable in any conventional manner, such as in conventional word processing systems (e.g., Microsoft WORD® or the like), e-mail handling systems, etc.

As another example, if the classification analysis engine 306 recognizes the input strokes or stroke sets as containing drawing strokes, the data may then be transferred to an annotation recognition system or method 314, which can be used to recognize textual information in the drawing. Further processing can proceed in any conventional manner. For example, if desired, the drawings may be "cleaned-up," wherein the handwritten annotations may be replaced with machine-generated text, handwritten drawing lines or shapes (e.g., circles, triangles, rectangles, etc.) may be replaced with machine-generated elements, and the like. Also, the drawings (either the handwritten versions or later machine-generated versions) can be introduced into any suitable programs or systems without departing from this invention.

The classification analysis systems and methods 306 used in some examples of the invention also may recognize other specific writing or drawing types without departing from the invention. For example, a classification analysis system may recognize input stroke sets as containing music, mathematical information, tables, charts, graphs, flow diagrams, etc., without departing from the invention. Such stroke sets, if present, could be sent to more specialized recognition systems and/or to other suitable processing applications without departing from the invention.

Some or all of the functions described in conjunction with FIG. 3 could be performed on input ink data after a user completely enters all ink onto the page (e.g. upon a user's command, such as a "save," "parse," "close," or "recognize" command). Because of the extended computer processing time required to perform typical layout analyses and handwriting recognition analyses, however, a user may experience significant delays if processing were conducted on this infrequent ad hoc basis. These delays may last long enough such that the user would become frustrated waiting for the computer system to complete its analyses before moving on to the next desired operations (e.g., entering more ink, moving on to a new page, printing, etc.).

Systems and methods according to examples of the present invention allow a pen-based computing system to perform various analyses, such as layout analysis 302, classification analysis 306, handwriting recognition analysis 310, etc., incrementally, in real time, while the user continues to use the pen-based computing system (e.g., to enter and/or modify the ink strokes on the page). Moreover, in some examples of the systems and methods according to the invention, the various parser engines operate in a background thread, on a "snapshot" of the application data structure, in order to minimize the time that the application data structure is unavailable to the user for entering ink (the term "application data structure," as used herein, means a data structure used in connection with an application program).

B. General Description of the Invention

This invention relates generally to systems and methods for processing digital ink. In one example, a method according to the invention includes obtaining data representing one or more ink strokes, wherein the data is stored as an application data structure, and wherein a user may change the application data structure by adding one or more ink strokes, by deleting one or more ink strokes, or by modifying one or more ink strokes. A first analysis procedure (such as an ink layout analysis procedure 302) may be conducted on a first snapshot of the application data structure to produce a first data structure, wherein the first snapshot represents the application data structure at a first point in time. Similarly, a second analysis procedure different from the first analysis procedure (such as a handwriting recognition analysis procedure 310) may be conducted on a second snapshot of the application data structure to produce a second data structure, wherein the second snapshot represents the application data structure at a second point in time. This second point in time may be the same as or different from the first point in time. The application data structure is modified based on these first and second analysis procedures. Those skilled in the art will recognize that any number of desired analysis procedures may be conducted without departing from this invention.

By analyzing a "snapshot" of the application data structure, rather than directly analyzing and processing the application data structure itself, a user can continue adding data representing ink strokes or modifying or deleting existing ink strokes in the application data structure while the various analyses are being conducted. For example, in some examples of systems and methods according to the invention, input ink data changing the application data structure may be received after the first point in time and/or after the second point in time (when the snapshot(s) is (are) taken), but before the modifying step is carried out. In these instances, during the "modifying" step, the application data structure will not be modified to over-write changes made by the user after the first (or second) point in time (i.e., the user-made changes to the application data structure will take precedence over changes to the application data structure made based on the analysis procedures).

The various "snapshots" used in the analyses described above may be the same or different without departing from the invention. A "snapshot," as used in this specification, refers to a copy of the data structure of the input ink data at a specific point in time. By working on "snapshots" of the data structure, analyses by separate analysis engines may proceed concurrently, partially concurrently, consecutively, or in any desired order without departing from the invention. Moreover, the analysis engines may operate on the snapshots while the application data structure remains available to the user for ink entry and/or editing and/or other suitable operations.

Another example of the invention relates to a different method for processing digital ink. In this exemplary procedure, data representing one or more digital ink strokes is received and stored as an application data structure. A first snapshot of the application data structure is analyzed to produce a first data structure (which is a revised version of the application data structure). During the analyzing step, however, the application data structure is modified (e.g., through user input, in which a user adds one or more ink strokes, deletes one or more ink strokes, or otherwise modifies one or more ink strokes). A revised application data structure, based on the first data structure and modifications to the application data structure made during the modifying step, is created and replaces the original application data structure. These steps can be repeated as the user continues to enter and/or modify ink in the application data structure. Additionally, as described above, the analysis step may include two or more analysis procedures without departing from the invention, and these analysis procedures may take place concurrently, partially concurrently, consecutively, or in any other suitable manner known in the art.

Another example of a method for processing digital ink according to this invention includes receiving data representing one or more digital ink strokes over a first time period, wherein the data is stored as an application data structure. This application data structure is subjected to plural analyses over the first time period, wherein, during at least one of the analyzing steps, a user makes changes to the application data structure (e.g., by adding one or more ink strokes, deleting one or more ink strokes, or modifying one or more ink strokes). The user's changes to the application data structure, however, do not affect the data structure being analyzed in the analyzing step. Once the analysis is completed, the application data structure is modified to form a revised application data structure, wherein the revised application data structure is produced taking into consideration the modifications made to the data structure during the analyzing step(s) and any changes made by the user during the analyzing step(s). As described above, the analyzing step(s) in this example may include two or more different analyzing procedures (such as a layout analysis procedure and a handwriting recognition analysis procedure), and the analyzing procedures may take place concurrently, partially concurrently, consecutively, or in any other suitable manner, without departing from the invention.

The revised or modified application data structure in these examples may contain changes made by the user and/or the system during the analyzing step(s). In general, user-made changes will take precedence over system-made changes, if there is overlap or conflict. Additionally, to save processing time, the analysis and modifying steps may be confined to portions of the application data structure changed since the previous processing steps, and to area in the data structure immediately adjacent the portions of the data structure changed since the previous processing steps.

Other examples of this invention relate to systems for performing the above-described methods, as well as to computer-readable media that include computer-executable instructions for performing the above-described methods and/or operating the above-described systems. The systems according to the invention may include various components, such as an input device for receiving input ink data and a processor system for processing the data, like the systems described above in conjunction with FIGS. 1 and 2.

C. Detailed Description of Exemplary Systems and Methods for Practicing the Invention FIG. 4 illustrates a schematic diagram of one example of a system useful for practicing the present invention. As illustrated, the overall system 1310 includes an application system or program 1320, which includes a parser 1322. The overall system 1310 may be embodied in a pen-based computing system like that illustrated in FIG. 2. The user 1300 enters ink strokes into the system 1310 (or the ink strokes are downloaded, e.g., from memory or an external source), and the ink strokes are stored by the application program 1320, for example, in an application data structure 1302 (which may be in the form of a document tree data structure 1302, like those illustrated in FIGS. 6A and 6B). So that the user 1300 can continue to make modifications to the document tree data structure 1302 while the parser 1322 operates, the parser 1322 contains a mirror tree data structure 1304. Changes made to the document tree data structure 1302 (e.g., by the user 1300, the parser 1322, from another source, etc.) are immediately passed on to the mirror tree data structure 1304 so that the mirror tree data structure 1304 generally "mirrors" the content of the document tree data structure 1302.

The mirror tree data structure 1304 is used to supply input data to the two analysis engines 1306 and 1308 in the parser 1322. In the example illustrated in FIG. 4, one analysis engine is a layout analysis engine 1306 (which may conduct, for example, a layout analysis 302, as discussed above in conjunction with FIG. 3), and the other is a recognition engine 1308 (which may conduct, for example, handwriting recognition analysis 310 and/or annotation recognition analysis 314, as discussed above in conjunction with FIG. 3). The engines 1306 and 1308 receive "snapshots" 1324 and 1326, respectively, of the mirror tree data structure 1304 as input data, and they operate on these "snapshots" 1324 and 1326 instead of operating directly on the document tree data structure 1302 or the mirror tree data structure 1304. In this manner, the user 1300 can continue performing operations on the document tree data structure 1302 in the application program 1320 while the various parser analysis engines 1306 and 1308 also are operating, and the user 1300 does not experience an interruption in operation (e.g., processing delays) as the engines 1306 and 1308 operate on the data.

To produce a "snapshot" in some examples of the invention, an existing snapshot data structure is compared with the mirror tree data structure 1304. The differences between the two are noted, and a minimal number of operations are performed to synchronize the snapshot to the mirror tree data structure 1304. In this manner, minimal data rewrite occurs in making the snapshot (e.g., unchanged data from a previous snapshot is not rewritten).

The output of the parser engines 1306 and 1308 may be a modified or revised data structure. For example, if the layout analysis engine 1306 is like that illustrated in FIG. 5, the output of layout analysis engine 1306 may be a data structure that includes individual ink strokes grouped into associated words, lines, blocks, and the like. Operation of a layout analysis engine of this type is described in more detail below. Similarly, if the parser engine 1308 is a handwriting recognition system 310, the output may include information or a data structure that ties the ink strokes to machine-generated text.

When the parser engines 1306 and 1308 complete their operations on the snapshot input data 1324 and 1326, respectively, the resulting information is sent back to the application program 1320, as indicated by arrows 1328 and 1330, respectively. As noted above, however, the user 1300 may change the document tree data structure 1302 during the time period that the parser engines 1306 and 1308 operate on the snapshots 1324 and 1326. Therefore, before writing the parser analysis engine results back to the document tree data structure 1302, the parser 1322 compares the document tree data structure 1302 currently in the application program 1320 (including the user's changes) to the revised document tree data structure(s) sent by the parser engines 1306 and 1308, optionally using the mirror tree data structure 1304. If the user 1300 made changes to the document tree data structure 1302 that are not contained in the revised document tree data structure(s) from the parser engines 1306 and 1308, or if user-made changes to the document tree data structure render moot or conflict with changes to the data structure(s) made by the parser engines 1306 and 1308 (e.g., by adding, deleting, or modifying strokes), then the application document tree data structure 1302 is revised only to include the changes made by the parser analysis engines that do not conflict with the user-made changes (user-made changes override parser-made changes). Also, only portions of the document tree data structure 1302 modified from the existing version are changed or rewritten, in order to reduce data writing time (and the associated interruption experienced by the user 1300). In this manner, the finally revised document tree data structure present in the application program 1320 will include all changes made by the user 1300 and the results of the previous parser engine analyses, to the extent that the parser engine made changes that are not inconsistent with or trumped by user made changes.

Because the document tree data structure 1302 contains shared data ultimately modifiable by the user 1300 as well as the parser engines 1306 and 1308, the user 1300 cannot input new data into the document tree data structure 1302 while it is being rewritten to include the parser-made changes. If a user 1300 attempts to do so, systems and methods according to the invention can handle these efforts in any suitable manner. For example the new strokes or changes may be ignored, or they may be stored in a temporary buffer memory until the revised application document tree data structure is available for data input. However, because the document tree data structure 1302 in the application program 1320 according to this example of the invention generally is unavailable only during the time the system rewrites the changed portions of the data structure, the unavailable time period typically is quite short, and often unnoticed by the user.

Once the document tree data structure 1302 is rewritten or modified (including the user and/or parser engine made changes), the mirror tree data structure 1304 is updated to mirror the rewritten or modified document tree data structure 1302, and the parser engines 1306 and 1308 can repeat their analyses (if necessary). Advantageously, the parser engines 1306 and 1308 will operate only on the portions of the document tree data structure that have been recently modified (and any portions affected by the recent modifications), to reduce processing time. By incrementally updating the parser engine operations at the same time the user inputs data, the parser 1322 can generally keep up with the user's data entry, thereby minimizing processing delays observed by the user.

As mentioned above, in some examples of the invention, processing time may be reduced by limiting processing to portions of the data structure where changes have occurred (and all areas affected by these changes). If user input or previous parser engine operations have not affected some portions of a data structure, there may be no need for the parser engine(s) to again analyze these same portions. As examples, systems and methods according to some examples may reanalyze any portion of the data structure located within a predetermined distance of a change. For example, reanalysis may include the line of any change and any one or two lines surrounding the change, any strokes located within a circle of a preselected radius surrounding the change, any block of text (as described in more detail below) including a change, or the like. The following explains examples of the invention that take advantage of these features in more detail.

D. An Example of Processing Taking Place During the Incremental Analysis

The data analyzed or processed in systems and methods according to examples of the present invention can take on any suitable form or structure. For example, in one exemplary procedure as illustrated in FIG. 3, individual strokes 300 of input ink data are combined together into a data structure as a result of a succession of decisions made by a layout analysis engine 302, which groups or associates certain individual strokes based on an overall ink layout and statistics obtained from the input ink. The layout analysis engine 302 may provide a hierarchical clustering of ink strokes on a page, which allows global statistic calculations over the cluster(s). The first stroke grouping decisions are conservative, based on local layout relationships when the clusters of ink strokes are small (e.g., clusters representing individual strokes or relatively short combinations of strokes). Later stroke grouping decisions can be more aggressive, due to the more global statistics collected from larger clusters (e.g., stroke sizes over a longer line, relative stroke spacing, line angles, etc.). Multiple passes through the input ink data may be conducted to enable increasingly aggressive decision making in determining whether to merge strokes to form stroke sets, such as words, lines, and/or blocks 304 of input ink strokes.

FIG. 5 generally illustrates steps or parse engines involved in one example of an ink layout analysis parser engine, system, or method 1306 useful in producing and/or modifying data structures used in some examples of this invention. Because of the freedom provided to a user in inputting digital ink into the systems and methods according to some examples of the invention (e.g., a user is allowed to write anywhere on a page, in any orientation, at any time, using any desired stroke size), when the layout analysis procedure 302 of FIG. 5 begins, there may be no preliminary information from which to determine the proper layout, orientation, or type of input data (e.g., whether the incoming input data 400 is textual, drawing, mathematic, music, flow diagrams, charts, graphs, etc.). Element 402 in FIG. 5 provides a general graphical representation of an input data structure 400. The graphical representation 402 is illustrated in more detail in the parse tree data structure of FIG. 6A. In general, when the layout analysis procedure 302 begins (e.g., even as the user may continue to input ink strokes into the pen-based computing system), the system treats every stroke S 500 on a given page P 508 as a separate word W 502, every word W 502 is treated as a separate line L 504, and every line L 504 is treated as a separate block B 506. The layout analysis engine 302 performs the task of associating or merging strokes together to form stroke sets containing proper words, lines, and blocks of associated ink data. While any suitable layout analysis engine could be used in conjunction with this invention, one example is described in more detail below.

While this description of the exemplary layout analysis engine 302 uses terms like "word," "line," and "block," these terms are used in this specification as a matter of convenience to refer to one or more associated strokes or stroke sets. At the time the layout analysis 302 initially occurs in this example of the invention, no final determination has been made as to whether individual strokes or stroke sets constitute writing, drawings, etc.

The layout analysis engine 302 according to this example of the invention operates greedily, such that during each pass (or operation of each parse engine), stroke or line merger operations occur, but splits do not. Moreover, the engine 302 may be operated with tests and tolerances such that it should not be necessary to go back and correct an undesired merger operation.

As a result of the operation of layout analysis engine 302, the individual strokes 500 may be combined into associated words W, lines L, and blocks B, where appropriate. FIG. 6B illustrates a graphical representation 406 of a possible data structure for the data output 404 from the layout analysis engine 302. As evident from a comparison of FIGS. 6A and 6B, the Page 508 overall contains the same stroke information, but certain strokes S 500 have been combined or associated together to form words W 510, and certain words W 510 have been joined together to form a line L 512 in the data structure of FIG. 6B. Of course, a word W 510 may contain any number of strokes S 500, and likewise a line L 512 may contain any number of words W 510. Also, although not illustrated in the particular parse tree example of FIG. 6B, two or more lines L 512 also may be joined together to form a block B 514.

In addition to helping define the structure of a document, the various nodes in the parse tree (e.g., FIG. 6B) may be used to store spatial information relating to various levels in the tree. For example, each line level node may store a regression/fit line of all points that make up the strokes of the line, the convex hull of each stroke in the line, and/or any other desired information. Also, the parse tree data structures can be modified by applying various elementary operations on the strokes, words, lines, and blocks contained in it. Suitable operations may include: add, remove, merge, split, and reparent. More complex operations may be composed using these elementary operations. As these operations are performed on the data structure tree, the statistics maintained at the different node levels may be automatically updated to correspond to the new structure.

FIG. 5 provides a schematic overview of one example of a suitable layout analysis engine 1306 useful in some examples of this present invention. In this example, a first step in the layout analysis procedure 302 is a temporal line grouping step 408, which generally compares features of temporally adjacent strokes and combines them as lines, if appropriate. Various factors may be taken into account in determining whether a temporal line grouping should be made from two or more strokes, such as stroke size, inter-stroke spacing, stroke angle, etc. Once this temporal line grouping step 408 is completed, the next step in the analysis 302, a spatial block grouping step 410, compares the temporal line groupings and combines lines that are located close to one another as spatial blocks. Various factors may be taken into account in determining whether a spatial block grouping should be made, such as stroke size, inter-stroke spacing, line angle, etc.

The temporally grouped lines (from step 408) may be further grouped, optionally taking into consideration their spatial block relationship or orientation, in a spatial line grouping step 412. This spatial line grouping step 412 need not consider the time of one stroke compared to another stroke, although factors in addition to the lines' spatial relationship may be taken into consideration, such as line angle, stroke size, etc. Also, the results of the spatial block grouping procedure 410 described above may be used as a factor in determining whether a spatial line grouping should be made between two existing temporal line groupings.

Once the spatial line groupings have been completed, the layout analysis procedure 302 according to this example may then combine the individual strokes in the line groupings into one or more spatial word groupings 416, depending, for example, on factors such as inter-stroke spacing, line orientation, stroke size, etc.

FIG. 5 also illustrates an optional parse engine or step in broken lines that may be performed as part of a layout analysis 302. This optional step is called "list detection" 414. Often, when people write a list, they tend to write a column of numbers or letters, and then fill in the list elements. At other times, people will write out the content of the list, and then later add a column of numbers, letters, or bullet points. This list detection engine 414 may detect these special circumstances and combines the number, letter, or bullet point strokes with the corresponding list element text.

The various steps in this exemplary ink analysis engine 302 (FIG. 5) may be changed in order or omitted without departing from the invention. For example, if desired, the spatial line grouping step 412 may take place before the spatial block grouping step 410.

The output data 404 from the layout analysis engine 302 can be used in any suitable manner, such as in a classification engine 306, as illustrated in FIG. 3, and from there the data may proceed to other appropriate processing engines (e.g., annotation recognition 314, handwriting recognition 310, etc.). Layout analysis engine 302, or a combination of layout analysis engine 302 and classification engine 306, may form a parser engine 1306 as illustrated in conjunction with FIG. 4.

Of course, this invention is not limited to operation with a layout analysis engine or any specific type of analysis engine. Other suitable engines or procedures for grouping or associating individual strokes into appropriate data structures or any other desired analysis can be performed without departing from this invention. Also, if desired, prior to processing, the user could indicate to the system that certain strokes always should be grouped together (e.g., by drawing a line around, highlighting, or otherwise selecting input data strokes to be associated together).

E. The Incremental Analysis

As noted above, the incremental analysis systems and methods according to the invention may include any suitable data processing analyses, like those illustrated in conjunction with FIG. 3. The described examples of the invention include a layout analysis 302, which also may include a classification analysis 306, and a handwriting recognition analysis 310.

The layout analysis process (e.g., like that illustrated in FIG. 5) or other desired analysis procedures may initially begin at any time after the user begins adding strokes to a page and/or editing strokes on a page and/or otherwise modifying strokes on a page. As the user continues modifying the page, the layout analysis process 302 (and/or other desired procedures) may be repeated on the revised page data structure, optionally focusing on portions of the data structure that have been modified since a previous iteration of the layout analysis engine 302 (and portions surrounding or affected by the changed portions). FIGS. 7A, 7B, 8A, 8B, 9A, and 9B illustrate flow diagrams of various procedures for incrementally analyzing input data.

Figure 7A:
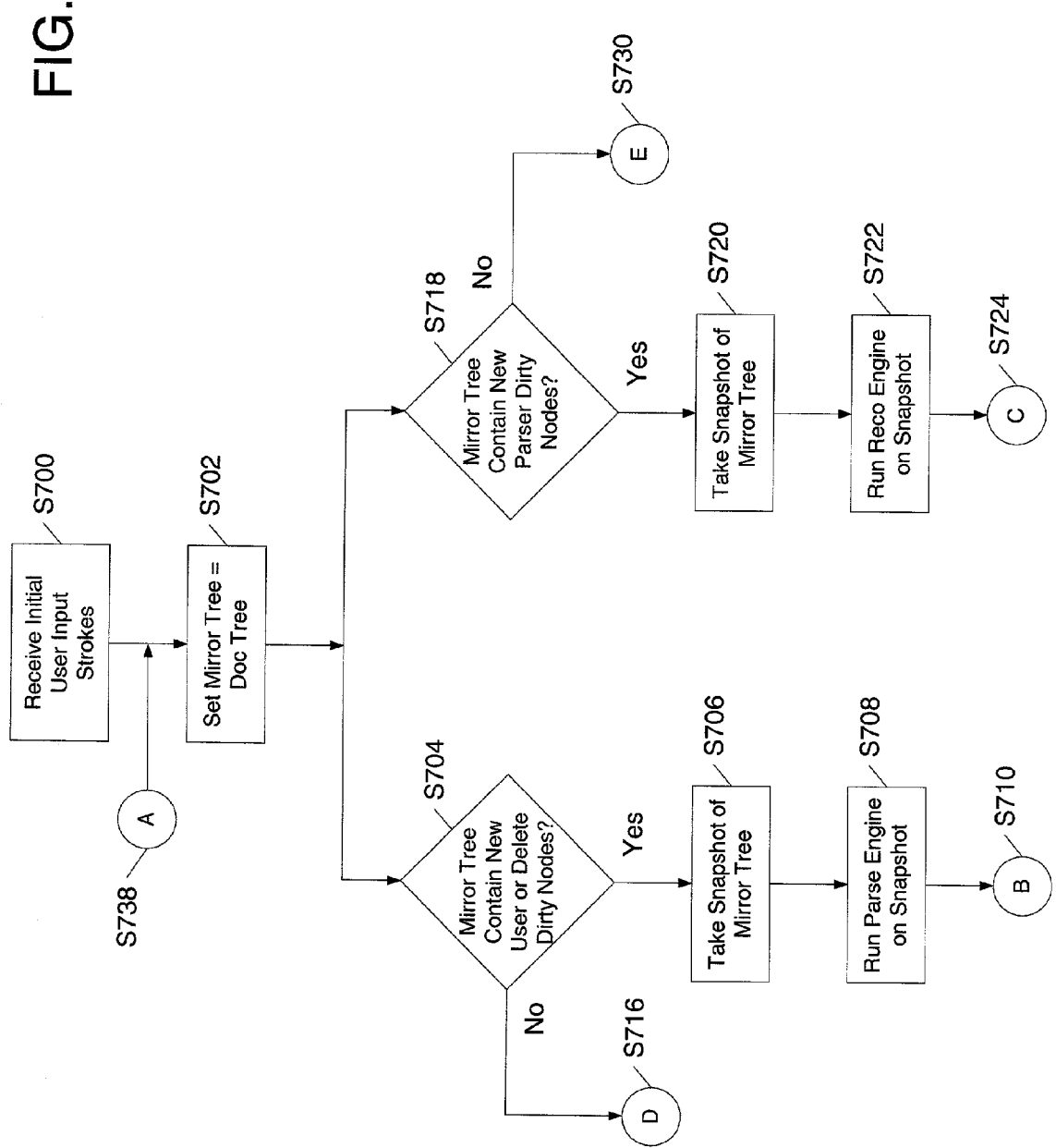
FIGS. 7A and 7B illustrate flow charts describing operation of systems and methods according to one example of the present invention.
Figure 7B:
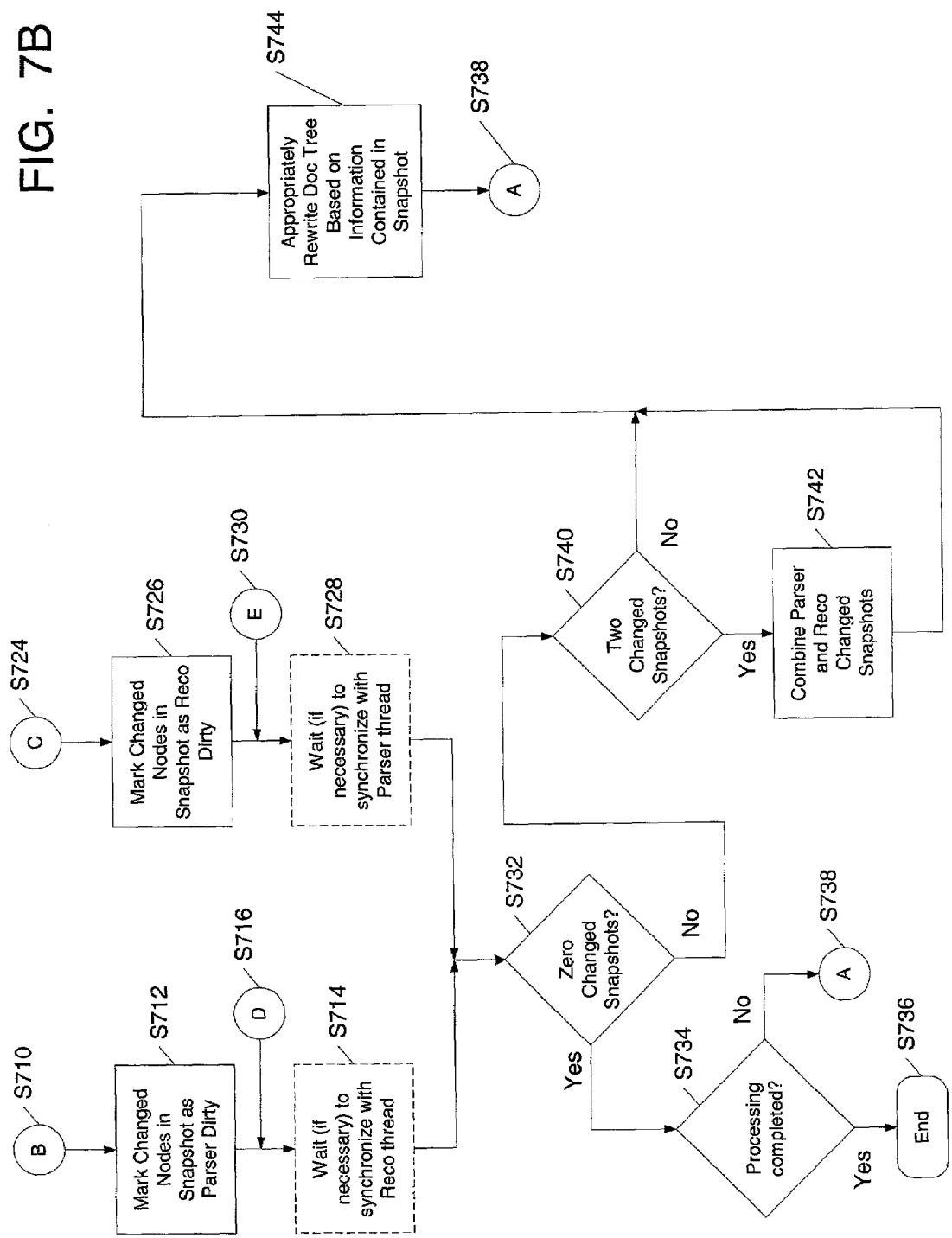

FIGS. 7A and 7B illustrate an exemplary incremental ink analysis procedure in which two different parser engines (e.g., a layout analysis engine and a handwriting recognition engine) operate concurrently and in parallel. At Step S700, the system receives initial user input strokes as input data (alternatively, a user could download a starting document from another source or another application, or otherwise receive a suitable input or starting document). Initially, as illustrated in FIG. 6A, the input data may be contained in a document tree data structure in which every stroke is treated as a separate word, a separate line, and a separate block. One purpose of a layout analysis engine (like that illustrated in FIG. 5) is to group the individual strokes into associated words, lines, and blocks of ink data.

Referring also to FIG. 4, initially (Step S702) the mirror tree data structure 1304 in the parser engine 1322 is set equal to the document tree data structure 1302 being used in the application program 1320. As the user 1300 operates on the document tree data structure 1302, the systems and methods according to this example of the invention keep track of the changes made by the user by marking the nodes (see FIGS. 6A and 6B) that have been changed by the user as "user dirty" (when the user has changed or added a stroke, word, line, or block) or "delete dirty" (when the user has deleted a stroke, word, line, or block). In Step S704, the system determines whether any user dirty or delete dirty nodes exist in the data structure. If YES, this tells the system that the user has acted on the data structure and that a new layout analysis may be needed, at least with respect to the nodes marked user dirty or delete dirty. Then, a snapshot 1324 is taken of the mirror tree data structure 1304 (Step S706), and the layout analysis engine 1306 operates on this snapshot 1324 (Step S708). Once the snapshot is taken in Step S704, the user dirty and/or delete dirty nodes in the mirror tree are changed to "clean."

Processing may take place on any suitable amount of data surrounding each dirty node (e.g., all data in the block containing the dirty node; all data within a predetermined distance of the dirty node; all data in the line containing the dirty node and, optionally, all data in one or more lines surrounding the dirty node (if any); etc.). Advantageously, the systems and methods according to at least some examples of the invention will minimize or reduce redundant calculations (e.g., by not reanalyzing unchanged nodes) while still reanalyzing sufficient surrounding data to assure that all necessary data is reanalyzed and accuracy is maintained.

Moving forward to FIG. 7B (as illustrated by transfer bullet B (S710)), nodes that are changed by the layout analysis engine 1306 are marked as "parser dirty" (Step S712), so that the systems and methods according to this example of the invention can keep track of previous changes to the data structure made by the layout analysis engine 1306. After the parser dirty nodes are marked (Step S712), if necessary or desired, the systems and methods according to this example of the invention may wait to synchronize the timing with the recognition engine (Step S714), which is explained in more detail below. Because Step S714 is optional and/or not always necessary, it is shown in broken lines in FIG. 7B.

If, at Step S704, there are no user or delete dirty nodes (answer NO), the procedure skips Steps S706, S708, and S712 and moves forward to Step S714, as indicated by transfer bullet D (Step S716).

The systems and methods according to the example of the invention illustrated in FIGS. 7A and 7B include two independent analysis engines or threads, namely the layout analysis engine or thread 1306 and the recognition engine or thread 1308, running concurrently and in parallel. Of course, any number of independent engines or threads may run in the background of the application program 1320 without departing from the invention. After Step S702, the systems and methods according to this example of the invention determine whether the mirror tree data structure contains any new parser dirty nodes (Step S718). If YES, a snapshot 1326 of the mirror tree data structure 1304 is taken (Step S720), and the recognition engine 1308 operates on this snapshot 1326 (Step S722). The snapshot 1326 used in Step S722 may be the same as snapshot 1324 used in Step S708 (e.g., only one "snapshot" is taken) or it may be different (indicating that the snapshots were taken at different points in time), without departing from the invention. After the snapshot is taken in Step S720, the parser dirty nodes are marked "clean" in the mirror tree.

Returning to FIG. 7B (indicated by transfer bullet C (Step S724)), in the next step of the illustrated procedure, the system marks any nodes changed by the recognition engine as "reco dirty" (Step S726). Then, in Step S728, processing in the recognition engine 1308 waits (if necessary) to synchronize with the layout analysis engine 1306. Again, because Step S728 is optional and/or not always necessary, it is shown in broken lines.

If, at Step S718, the procedure determines that the mirror tree data structure 1304 does not include parser dirty nodes (answer NO), the procedure skips Steps S720, S722, and S726 and jumps to Step S728, as indicated by transfer bullet E (Step S730).

Once the layout analysis engine 1306 and the recognition engine 1308 have completed their processing and are resynchronized, the procedure then determines whether the snapshots have been changed by the layout analysis engine 1306 and/or the handwriting recognition engine 1308 (Step S732). If there are no snapshot changes (answer YES at Step S732), the system determines whether processing has been completed (Step S734), and if YES, the procedure ends (Step S736). This ending may be temporary, for example, lasting only until a user resumes making changes to the document tree data structure 1302. As another alternative, the system may check automatically and periodically for new user-made changes. If processing is not completed at Step S734 (answer NO, for example, if a user has made changes to the document tree data structure), the procedure returns to Step S702, as indicated by transfer bullet A (Step S738).

If, at Step S732, the system determines that at least one snapshot has been changed (Answer NO), the system then determines whether both parser engines made changes to their respective snapshot (Step S740). If both parser engines did make changes to their snapshot (answer YES), the system then combines the layout analysis and handwriting recognition changed snapshots into one composite changed data structure (Step S742). If there is overlap or conflict, parser dirty nodes will override reco dirty nodes in this example because, as compared to the reco dirty nodes, the parser dirty nodes have more recently been changed by the user. If both engines did not make changes to their snapshot (answer NO), the system determines that the one changed snapshot includes all of the changes made by the layout analysis engine 1306 or the handwriting recognition engine 1308, Step S742 is skipped, and the system proceeds using the single changed snapshot.

In Step S744, the parser 1322 uses the information contained in the snapshot data structure to rewrite the data in the document tree data structure 1302. Only portions of the document tree data structure 1302 that were changed by the layout analysis engine or the recognition engine are rewritten. In this manner, the processing system does not take time rewriting data in the document tree data structure 1302 that was not changed. Also, if user-made changes to the document tree data structure 1302 overlap or conflict with layout analysis engine or recognition engine made changes in the data structure, the document tree data structure 1302 is not changed to include the conflicting layout analysis engine or recognition engine made changes. In this way, the user-made changes take precedence over the system-made changes. The determination as to whether the document tree data structure 1302 contains new user-made changes may be accomplished, for example, by looking for user or delete dirty nodes in the mirror tree data structure 1304.

As indicated by transfer bullet A (Step S738), the procedure then returns to Step S702 to repeat the process on the revised or modified document tree data structure.

FIGS. 8A and 8B illustrate another example of a flow diagram that may be used in practicing the incremental analysis procedure according to the present invention. In the procedure exemplified in these drawings, the two parser engines 1306 and 1308 run consecutively, with the layout analysis engine 1306 running first and the handwriting recognition engine 1308 running later.

In this procedure, first the initial user input strokes are received in the document tree data structure 1302 (Step S800) (or the data is introduced into the system in some other manner, e.g., by downloading, from memory, from another application, etc.). Again, as this occurs, the mirror tree data structure 1304 is revised to mirror the document tree data structure 1302 (Step S802). In the next step, the system determines whether there are any user or delete dirty nodes in the mirror tree data structure 1304 (Step S804). If YES, a snapshot of the mirror tree data structure is taken (Step S806), and the layout analysis engine 1306 operates on the snapshot (Step S808). Once the snapshot is taken, user or delete dirty nodes in the mirror tree data structure 1304 are changed to "clean." Any nodes in the snapshot changed by the layout analysis engine 1306 are marked as "parser dirty" (Step S810). If the answer is NO at Step S804, the procedure skips Steps S806, S808, and S810.

In Step S812, the system determines whether there are any parser dirty nodes in the snapshot 1324 (if one has already been taken) or in the mirror tree data structure 1304 (if no snapshot has been taken). If parser dirty nodes exist (answer YES), then a snapshot is taken if one has not previously been taken (Step S814), and then the handwriting recognition engine 1308 is run on the snapshot (Step S816). Once a snapshot is taken here (if necessary), any parser dirty nodes in the mirror tree data structure 1304 are marked "clean." Any nodes changed in the snapshot during operation of the handwriting recognition engine 1308 are marked "reco dirty" (Step S818). Alternatively, a single snapshot may be taken at the beginning of the procedure of FIG. 8A (before operation of the parse engine), and then all nodes of the mirror tree 1304 can be marked clean after the snapshot is taken.

Referring now to FIG. 8B (as indicated by transfer bullet B (Step S820)), the parser 1322 uses the information contained in the snapshot data structure to rewrite the data in the document tree data structure 1302 (Step S822). Only portions of the document tree data structure that were changed by the layout analysis engine or the recognition engine are rewritten, to thereby reduce data writing time (no need to rewrite unchanged data). Also, as described above, user-made changes to the document tree data structure 1302 will take precedence in the event that the user-made changes overlap or conflict with the layout analysis engine or recognition engine made changes.

Then, the procedure determines whether processing has been completed (Step S828). If YES, the procedure ends (Step S830, at least temporarily, until more changes are made to the document tree data structure), and if NO, the procedure returns to Step S802 and repeats, as indicated by transfer bullet A (Step S832). Also, as noted above, the system may periodically and automatically check for new user input.

If no parser dirty nodes exist at Step S812 (Answer NO), the procedure skips forward to Step S828, as indicated by transfer bullet C, Step S834.

FIGS. 9A and 9B illustrate an example of the invention in which the layout analysis engine 1306 and the handwriting recognition engine 1308 operate independent of one another, optionally in parallel and concurrently. FIG. 9A illustrates operation of the layout analysis engine 1306. As an initial step (Step S900), the system receives initial input in any appropriate manner (e.g., strokes from a user, download from some other source or application, etc.), and the mirror tree data structure 1304 is maintained equivalent to the document tree data structure 1302 on which the user operates (Step S902). The system then determines whether the mirror tree data structure 1304 contains user dirty or delete dirty nodes (Step S904). If YES, a snapshot 1324 of the mirror tree data structure 1304 is taken (Step S906), and the layout analysis engine runs on the snapshot 1324 (Step S908). Once the snapshot is taken, the mirror tree is changed to mark the user and/or delete dirty nodes as "clean." As in the previous examples, any nodes in the snapshot 1324 changed by the layout analysis engine 1306 are marked "parser dirty" (Step S910).

In the next step (Step S912), the parser 1322 uses the information contained in the snapshot data structure to rewrite the data in the document tree data structure 1302. Only portions of the document tree data structure that were changed by the layout analysis engine are rewritten, to thereby reduce data writing time (no need to rewrite unchanged data). Also, as described above, user-made changes to the document tree data structure 1302 will take precedence in the event that the user-made changes overlap or conflict with the layout analysis engine made changes.

The system then determines whether processing has been completed (Step S918), and if YES, the procedure ends (Step S920), at least temporarily until additional changes are introduced into the document tree data structure 1302 or until an automatic or periodic review of the system is performed, as discussed above. If additional processing is required (answer NO at Step S918), the procedure returns to Step S902, as indicated by transfer bullet A (Step S922).

If, at Step S904, it is determined that the mirror tree data structure 1304 does not contain any user dirty or delete dirty nodes (answer NO), the procedure advances to Step S918, as shown by transfer bullet D (Step S924).

Operation of the handwriting recognition engine 1308, as illustrated in FIG. 9B, is similar to the operation of the layout analysis engine 1306. As an initial step (Step S950), the system receives initial input in any appropriate manner (e.g., strokes from a user, or other input, as described above), and the mirror tree data structure 1304 is maintained equivalent to the document tree data structure 1302 on which the user or application program 1320 operates (Step S952). The system then determines whether the mirror tree data structure 1304 contains parser dirty nodes (Step S954). If YES, a snapshot 1326 of the mirror tree data structure 1304 is taken (Step S956), and the handwriting recognition engine runs on the snapshot 1326 (Step S958). The parser dirty nodes in the mirror tree data structure 1304 are marked "clean" after the snapshot is taken. As in the previous examples, any nodes in the snapshot changed by the handwriting recognition engine may be marked "reco dirty" (Step S960).

In the next step (Step S962), the parser 1322 uses the information contained in the snapshot data structure to rewrite the data in the document tree data structure 1302. Only portions of the document tree data structure that were changed by the recognition engine are rewritten, to thereby reduce data writing time (no need to rewrite unchanged data). Also, user-made changes to the document tree data structure 1302 and parser engine made changes to the document tree data structure 1302 since the last snapshot will take precedence in the event that either of these changes overlap or conflict with the recognition engine made changes.

The system then determines whether processing has been completed (Step S968), and if YES, the procedure ends (Step S970), at least temporarily until additional changes are introduced into the document tree data structure 1302 or until an automatic or periodic check for new data is performed. If additional processing is required (answer NO at Step S968), the procedure returns to Step S952, as indicated by transfer bullet A (Step S972).

If at Step S954 it is determined that the mirror tree data structure does not contain any parser dirty nodes (answer NO), the procedure advances to Step S968, as shown by transfer bullet D (Step S974).

IV. CONCLUSION

While the invention has been described in terms of various specific examples, these specific examples merely exemplify the invention and do not limit it. Additionally, the various specified steps and procedures illustrated in the flow diagrams may be modified, changed in order, skipped, or otherwise varied without departing from the invention.

Moreover, the fact that a specific feature or function of the invention is described in conjunction with a specific example does not mean that this feature or function is limited to use with that specific example of the invention or that every example must include that specific feature or function. Rather, unless otherwise specified, the various features and functions described above may be used freely in any example of the invention. Those skilled in the art will appreciate that changes and modifications may be made to the exemplified versions of the invention without departing from the spirit and scope of the invention, as defined in the appended claims.

We claim:

1. A method for processing digital ink, comprising:
   obtaining data representing one or more ink strokes, wherein the data is stored as an application data structure;
   conducting a first analysis on a first snapshot of the application data structure to produce a first data structure, wherein the first snapshot is separate from the application data structure and represents a copy of the application data structure at a first point in time;
   conducting a second analysis different from the first analysis on a second snapshot of the application data structure to produce a second data structure, wherein the second snapshot is separate from the application data structure and represents a copy of the application data structure at a second point in time, and wherein the second point in time may be the same as or different from the first point in time; and
   modifying the application data structure based on the first analysis and the second analysis,
   wherein the application data structure is separate from the first and second snapshots such that; during either of the first analysis or the second analysis, a user may change the application data structure through a plurality of different types of actions including at least the following actions: (a) by adding one or more new ink strokes, (b) by deleting one or more existing ink strokes, and (c) by modifying one or more existing ink strokes, without the user's changes to the application data structure affecting the first analysis on the first snapshot or the second analysis on the second snapshot and without the first analysis on the first snapshot or the second analysis on the second snapshot affecting an ability of the application data structure to receive the user's changes.

2. A method according to claim 1, further comprising receiving data changing the application data structure from a user after the first point in time but before the modifying step.

3. A method according to claim 2, wherein, in the modifying step, the application data structure is modified based additionally on data received after the first point in time.

4. A method according to claim 1, wherein, in the modifying step, the application data structure is modified based additionally on data obtained from a user after at least one of the first or second points in time.

5. A method according to claim 1, wherein the first snapshot and the second snapshot contain the same application data structure.

6. A method according to claim 1, wherein the first analysis and the second analysis take place at least partially concurrently.

7. A method for processing digital ink, comprising:
   receiving data representing one or more digital ink strokes, wherein the data is stored as an application data structure;

analyzing a first snapshot of the application data structure to produce a first data structure, wherein the first snapshot is separate from the application data structure and represents a copy of the application data structure at a first point in time;

modifying the application data structure during said analyzing, wherein the modifying may include receipt of input indicating a plurality of different types of actions including at least the following actions: (a) receipt of input data adding one or more new ink strokes, (b) receipt of input data deleting one or more existing ink strokes, and (c) receipt of input data modifying one or more existing ink strokes, wherein the application data structure is separate from the first snapshot such that the modifying of the application data structure does not affect the analyzing of the first snapshot and such that the analyzing of the first snapshot does not affect an ability of the application data structure to receive the input; and replacing the application data structure with a revised application data structure, wherein the revised application data structure is based on the first data structure and modifications to the application data structure made during said modifying.

8. A method according to claim 7, further comprising:

analyzing the revised application data structure to produce a second data structure.

9. A method according to claim 7, further comprising:

analyzing a second snapshot of the revised application data structure to produce a second data structure, wherein the second snapshot is separate from the revised application data structure and represents a copy of the revised application data structure at a second point in time;

modifying the revised application data structure during said analyzing the second snapshot, wherein the modifying of the revised application data structure may include receipt of input indicating a plurality of different types of actions including at least the following actions: (a) receipt of input data adding one or more new ink strokes, (b) receipt of input data deleting one or more existing ink strokes, and (c) receipt of input data modifying one or more existing ink strokes, wherein the revised application data structure is separate from the second snapshot such that the modifying of the revised application data structure does not affect the analyzing of the second snapshot and such that the analyzing of the second snapshot does not affect an ability of the revised application data structure to receive the input; and replacing the revised application data structure with a second revised application data structure, wherein the second revised application data structure is based on the second data structure and modifications to the revised application data structure made during said modifying the revised application data structure.

10. A method according to claim 7, further comprising:

analyzing a second snapshot of the application data structure to produce a second data structure, wherein the second snapshot is separate from the application data structure and represents a copy of the application data structure at a second point in time, wherein the revised application data structure is based additionally on the second data structure, and wherein the second snapshot may be the same as or different from the first snapshot.

11. A method according to claim 10, wherein said analyzing the second snapshot takes place at least partially concurrently with said analyzing the first snapshot.

12. A computer-readable medium having computer-executable instructions stored thereon for performing steps comprising:

storing data representing one or more ink strokes as an application data structure;

conducting a first analysis on a first snapshot of the application data structure to produce a first data structure, wherein the first snapshot is separate from the application data structure and represents a copy of the application data structure at a first point in time;

conducting a second analysis different from the first analysis on a second snapshot of the application data structure to produce a second data structure, wherein the second snapshot is separate from the application data structure and represents a copy of the application data structure at a second point in time, and wherein the second point in time may be the same as or different from the first point in time; and modifying the application data structure based on the first analysis and the second analysis, wherein the application data structure is separate front the first and second snapshots such that during either of the first analysis or the second analysis, the application data structure may be changed through a plurality of different types of actions including at least the following actions: (a) receipt of input data adding one or more new ink strokes, (b) receipt of input data deleting one or more existing ink strokes, and (c) receipt of input data modifying one or more existing ink strokes, without the changes to the application data structure affecting the first analysis on the first snapshot or the second analysis on the second snapshot and without the first analysis on the first snapshot or the second analysis on the second snapshot affecting an ability of the application data structure to receive the input data.

13. A computer-readable medium according to claim 12, having further computer-executable instructions stored thereon for performing the step of storing additional data changing the application data structure after the first point in time but before the modifying step.

14. A computer-readable medium according to claim 13, wherein, in the modifying step, the application data structure is modified based additionally on data stored after the first point in time.

15. A computer-readable medium according to claim 12, wherein, in the modifying step, the application data structure is modified based additionally on data stored after at least one of the first or second points in time.

16. A computer-readable medium according to claim 12, wherein the first snapshot and the second snapshot contain the same application data structure.

17. A computer-readable medium according to claim 12, wherein the first analysis and the second analysis take place at least partially concurrently.

18. A computer-readable medium having computer-executable instructions stored thereon for performing steps comprising:

storing data representing one or more digital ink strokes as an application data structure;

analyzing a first snapshot of the application data structure to produce a first data structure, wherein the first snapshot is separate from the application data structure and represents a copy of the application data structure at a first point in time;

receiving input data modifying the application data structure during the analyzing step, wherein the input data may be received as a result of a plurality of different types of actions including at least the following actions: (a) receipt of input data adding one or more new ink strokes, (b) receipt of input data deleting one or more existing ink strokes, and (c) receipt of input data modifying one or more existing ink strokes, wherein the application data structure is separate from the first snapshot such that receiving the input data modifying the application data structure does not affect the analyzing of the first snapshot and such that the analyzing of the first snapshot does not affect an ability of the application data structure to receive the input data; and replacing the application data structure with a revised application data structure, wherein the revised application data structure is based an the first data structure and modifications to the application data structure made during the modifying step.

19. A computer-readable medium according to claim 18, having further computer-executable instructions stored thereon for performing the step of analyzing the revised application data structure to produce a second data structure.

20. A computer-readable medium according to claim 18, having further computer-executable instructions stored thereon for performing the steps of:

analyzing a second snapshot of the revised application data structure to produce a second data structure, wherein the second snapshot is separate from the revised application data structure and represents a copy of the revised application data structure at a second point in time;

receiving input data modifying the revised application data structure during the step of analyzing the second snapshot, wherein the input data modifying the revised application data structure may be received as a result of a plurality of different types of actions including at least the following actions: (a) receipt of input data adding one or more ink strokes, (b) receipt of input data deleting one or more existing ink strokes, and (c) receipt of input data modifying one or more existing ink strokes, wherein the revised application data structure is separate from the second snapshot such that the receiving of the input data modifying the revised application data structure does not affect the analyzing of the second snapshot and such that the analyzing of the second snapshot does not affect an ability of the revised application data structure to receive the input data; and replacing the revised application data structure with a second revised application data structure, wherein the second revised application data structure is based on the second data structure and modifications to the revised application data structure made during the step of modifying the revised application data structure.

21. A computer-readable medium according to claim 18, having further computer-executable instructions stored thereon for performing the step of analyzing a second snapshot of the application data structure to produce a second data structure, wherein the second snapshot is separate from the application data structure and represents a copy of the application data structure at a second point in time, wherein the revised application data structure is based additionally on the second data structure, and wherein the second snapshot may be the same as or different from the first snapshot.

22. A computer-readable medium according to claim 21, wherein the step of analyzing the second snapshot takes place at least partially concurrently with the step of analyzing the first snapshot.

23. A system for processing digital ink, comprising:

an input device for receiving data representing one or more ink strokes;

a memory system for storing the data as an application data structure; and a processor system for: (a) conducting a first analysis on a first snapshot of the application data structure to produce a first data structure, wherein the first snapshot is separate from the application data structure and represents a copy of the application data structure at a first point in time, (b) conducting a second analysis different from the first analysis on a second snapshot of the application data structure to produce a second data structure, wherein the second snapshot is separate from the application data structure and represents a copy of the application data structure at a second point in time, and wherein the second point in time may be the same as or different from the first point in time, and (c) modifying the application data structure based on the first analysis and the second analysis, wherein the application data structure is separate from the first and second snapshots such that during either of the first analysis or the second analysis, the input device may receive input data changing the application data structure through a plurality of different types of actions including at least the following actions: (a) receipt of input data adding one or more new ink strokes, (b) receipt of input data deleting one or more existing ink strokes, and (c) receipt of input data modifying one or more existing ink strokes, without the input data changing the application data structure affecting the first analysis on the first snapshot or the second analysis on the second snapshot and without the first analysis on the first snapshot or the second analysis on the second snapshot affecting an ability of the application data structure to receive the input data.

24. A system according to claim 23, wherein the input device further receives data changing the application data structure after the first point in time but before the modifying step.

25. A system according to claim 24, wherein, in the modifying, the processor modifies the application data structure based additionally on data received after the first point in time.

26. A system according to claim 23, wherein, in the modifying, the processor modifies the application data structure based additionally on data received after at least one of the first or second points in time.

27. A system according to claim 23, wherein the first snapshot and the second snapshot contain the same application data structure.

28. A system according to claim 23, wherein the first analysis and the second analysis take place at least partially concurrently.

29. A system for processing digital ink, comprising:

an input device for receiving data representing one or more digital ink strokes, wherein the data is stored as an application data structure; and a processor system for: (a) analyzing a first snapshot of the application data structure to produce a first data structure, wherein the first snapshot is separate from the application data structure and represents a copy of the application data structure at a first point in time, (b)

modifying the application data structure during the analyzing step, wherein the modifying may include receipt of input indicating a plurality of different types of actions including at least the following actions: receiving input data adding one or more new ink strokes, receiving input data deleting one or more existing ink strokes, and receiving input data modifying one or more existing ink strokes, wherein the application data structure is separate from the first snapshot such that the modifying of the application data structure does not affect the analyzing of the first snapshot and such that the analyzing of the first snapshot does not affect an ability of the application data structure to receive the input data, and (c) replacing the application data structure with a revised application data structure, wherein the revised application data structure is based on the first data structure and modifications to the application data structure made during the modifying step.

30. A system according to claim 29, wherein the processor system further analyzes the revised application data structure to produce a second data structure.

31. A system according to claim 29, wherein the processor system further: (d) analyzes a second snapshot of the revised application data structure to thereby produce a second data structure, wherein the second snapshot is separate from the revised application data structure and represents a copy of the revised application data structure at a second point in time, (e) modifies the revised application data structure during the step of analyzing the second snapshot, wherein the modifying of the revised application data structure may include receipt of input data indicating a plurality of different types of actions including at least the following actions: receiving input data adding one or more new ink strokes, receiving input data deleting one or more existing ink strokes, and receiving input data modifying one or more existing ink stakes, wherein the revised application data structure is separate from the second snapshot such that the modifying of the revised application data structure does not affect the analyzing of the second snapshot and such tat the analyzing of the second snapshot does not affect an ability of the revised application data structure to receive the input data, and (f) replaces the revised application data structure with a second revised application data structure, wherein the second revised application data structure is based on the second data structure and modifications to the revised application data structure made during the step of modifying the revised application data structure.

32. A system according to claim 29, wherein the processor system further analyzes a second snapshot of the application data structure to produce a second data structure, wherein the second snapshot is separate from the application data structure and represents a copy of the application data structure at a second point in time, wherein the revised application data structure is based additionally on the second data structure, and wherein the second snapshot may be the same as or different from the first snapshot.

33. A system according to claim 32, wherein the analyzing of the second snapshot takes place at least partially concurrently with the analyzing of the first snapshot.

\* \* \* \* \*